United States Patent [19]

Radici et al.

[11] 4,105,638

[45] Aug. 8, 1978

[54] PROCESS FOR IMPROVING THE STABILITY OF ETHERIFIED ACETAL HOMOPOLYMERS

[75] Inventors: Pierino Radici, Turate (Como); Sergio Custro; Mario Ermoni, both of Gorla Minore (Varese); Paolo Colombo, Saronno (Varese), all of Italy

[73] Assignee: Societa' Italiana Resine S.I.R. S.p.A., Milan, Italy

[21] Appl. No.: 751,299

[22] Filed: Dec. 16, 1976

[30] Foreign Application Priority Data

Dec. 23, 1975 [IT] Italy .............................. 30687 A/75

[51] Int. Cl.² ............................................. C08G 2/36
[52] U.S. Cl. .................................. 528/130; 528/132; 528/134
[58] Field of Search ..................................... 260/67 FP

[56] References Cited

U.S. PATENT DOCUMENTS

| 3,192,182 | 6/1965 | Brown et al. ...................... 260/67 FP |
| 3,193,531 | 7/1965 | Heller ............................... 260/67 FP |
| 3,393,179 | 7/1968 | Leverett .......................... 260/67 FP |
| 3,477,993 | 11/1969 | Alsup et al. ....................... 260/67 FP |

*Primary Examiner*—Lucille M. Phynes
*Attorney, Agent, or Firm*—Sughrue, Rothwell, Mion, Zinn and Macpeak

[57] ABSTRACT

An etherified acetal homopolymer is stabilized by heat-treating said homopolymer suspended in a liquid diluent chosen from water or mixtures thereof with polar organic compounds, preferably in the presence of a basic compound, at a temperature of 100°–160° C and below the melting point of the homopolymer, thereby to substantially degrade the unstable fraction of said homopolymer.

15 Claims, No Drawings

PROCESS FOR IMPROVING THE STABILITY OF ETHERIFIED ACETAL HOMOPOLYMERS

The present invention concerns a treatment designed to improve the stability of etherified acetal homopolymers.

In the course of the present Specification, by acetal homopolymers, or simply homopolymers, will be meant those products with a molecular weight of at least 10,000, which are obtained either by the polymerisation of an aldehyde chosen from formaldehyde, acetaldehyde, and chloral or else by the polymerization of a cyclic oligomer of formaldehyde chosen from trioxan and tetraoxan.

As is known, the polymerization of the said aldehydes or cyclic oligomers of formaldehyde yields acetal homopolymers with at least one unstable terminal hydroxyl group for each macromolecule.

Transformation of the said hydroxyl groups into other more stable groups is therefore necessary in order to give the acetal homopolymers the thermal and chemical stability which is indispensable for their processing.

To this end the hydroxyl groups are generally converted into ester groups by reaction with anhydrides of carboxylic acids, and in particular with acetic anhydride, or into ether groups, especially by transetherisation by means of reaction with dialkyl acetals, orthoesters, ketals and orthocarbonates.

The etherified acetal homopolymers have a greater thermal and chemical stability than those containing ester terminal groups. The thermal decomposition of the ester groups in a nitrogen atmosphere generally occurs at 240°–260° C, whilst that of the ether groups occurs at 280°–320° C.

There are other valid reasons for preferring to convert the hydroxyl groups of the acetal homopolymers into ether groups. In fact the ester groups are easily hydrolized by alkaline reagents. Moreover, the higher resistance of the ether groups to thermal and chemical action renders the choice of those additives and stabilisers (such as, for example, phenolic compounds and basic organic compounds containing nitrogen) which are normally added to the acetal polymers less difficult.

Also known in the art are acetal copolymers which may be made by copolymerization of an aldehyde (such as formaldehyde) or its cyclic oligomers (such as trioxan) with nonaldehyde monomers, such as for example:

cyclic ethers, such as ethylene oxide, 1,3-dioxolane and epichlorohydrin;
unsaturated vinyl compounds, such as styrene, vinyl methyl ketone, acrolein and vinyl ether;
ketenes, such as dimethyl ketene.

With respect to such copolymers the etherified acetal homopolymers have advantages due to their higher crystallinity, and can thus be formed into shaped articles having improved properties of toughness, tensile strength and dimensional stability.

By means of etherification reactions it is not possible in practice to replace all the terminal hydroxyl groups of the acetal homopolymers by ether groups.

No matter what the etherification process chosen, the etherified homopolymers always contain small amounts of terminal groups different from the ether groups, and mainly hemiacetal groups ($-CH_2OH$), ester groups (generally formate groups) and orthoester groups ($-CH(OR)_2$).

The hemiacetal groups are those, initially present in the acetal homopolymer, which have not undergone any conversion during the etherification treatment. As is known, the thermal instability of these groups bring about a gradual unzippering of the macromolecular chain, with liberation of aldehyde monomer.

The ester terminal groups may be present in the acetal homopolymer before the etherification treatment, or they may form during the said treatment. Their thermal stability is inferior to that of ether groups and their thermal decomposition also leads to a degradation of the macromolecular chain in the manner previously described. Moreover, these acetal homopolymers including ester terminal groups are partially attacked by alkaline reagents.

The orthoester terminal groups form during the etherification reaction and have a thermal stability, especially in air, greater than that of the formate groups, but clearly inferior to that of the ether groups.

The decomposition temperature of the orthoester groups is of the order 195°–200° C and their resistance to alkaline reagents is less than that of the ether groups.

It is therefore of interest to selectively remove the unstable fraction consisting of polyoxymethylene chains with unstable end groups so as to give the said homopolymers the greatest degree of thermal and chemical stability.

Thus, the invention provides a process for eliminating the unstable polyoxymethylene chains of an etherified acetal homopolymer, characterized by forming a suspension of said homopolymer in a polar liquid diluent consisting of water or a mixture of water with a polar organic compound, and heat-treating said suspension at a temperature of from 100° to 160° C and below the melting point of said homopolymer and at a pressure such as to maintain said diluent in liquid form, for a period such as to ensure substantially complete degradation of said unstable chains.

Water is the polar diluent preferred for the purposes of the present invention; however, mixtures of water with polar organic compounds may also be used, provided that the etherified homopolymer is insoluble in the said mixtures under the operation conditions. The polar organic compounds useful for the purpose have preferably the following general properties: they are completely soluble in water under the heat-treatment conditions, they possess at least one atom of oxygen directly linked to an atom of carbon, and they have no acidic properties. The said compounds are conveniently chosen from mono- and polyhydric alcohols, ketones and linear and cyclic ethers. Examples of alcohols suitable for the purpose are methyl, ethyl, amyl, benzyl and cyclohexyl alcohols. Among the glycols, those preferred are ethylene glycol, diethylene glycol, butane-1,4-diol, and hexamethylene-1,6-diol. Among the ethers those preferred are di-n-amyl ether, dioxan and trioxan.

Preferably, the liquid diluent has a water content of at least 20% by weight. Best results are obtained with water contents in the said mixtures of from 60 to 98% by weight.

In a preferred embodiment, operation is carried out in the presence of a basic compound for the purpose of accelerating the degradation of the unstable fraction of the etherified homopolymer. In practice operation is carried out in a basic medium having generally a pH value of from 9 to 11.

The preferred basic compounds are hydroxides of alkali or alkaline-earth metals (e.g. the hydroxides of sodium, potassium and calcium), amines (such as tri-n-butylamine and triethylamine), ammonia, aminoalcohols (such as triethanolamine) and salts of a strong base and a weak acid (such as sodium acetate and carbonate). Best results are obtained with ammonia.

The amount of basic compound may vary from 0.001 to 40% by weight with respect to the liquid diluent, and preferably from 0.05 to 20% by weight.

Moreover the percentage of polymer in the suspension is advantageously maintained at a value of 1 to 60% by weight, and preferably from 10 to 40% by weight.

As stated above, the process is carried out at a temperature of from 100° to 160° C. At temperatures below 100° C degradation of the unstable fraction of the etherified homopolymer does not occur, or is very slow. On the other hand the process cannot be carried out at more than 160° C without danger of melting the etherified homopolymer.

The temperature is preferably from 120° to 155° C. The treatment time is generally from 1 minute to 5 hours, and preferably from 5 minutes to 3 hours.

Under these conditions the unstable fraction of the etherified homopolymer is completely, or almost completely, degraded.

The etherified homopolymers treated according to the method of the present invention possess high characteristics of thermal and chemical stability. Thus for example the thermal degradation of etherified homopolymers at 220° C in a nitrogen atmosphere expressed in weight loss percent per minute during the first ten minutes, is typically of 0.05 – 3% before treatment, and of the order of 0.001 – 0.02% after treatment.

Moreover, the fraction of the etherified homopolymers, which is unstable to alkaline attack, is typically of 0.5–30% by weight before treatment, and of about 0.2% by weight after treatment.

As is known the unstable fraction is determined by dissolving the etherified homopolymer at 150° C in benzyl alcohol containing 1% of triethanolamine, for a time equal to 30 minutes.

EXAMPLE 1

Into a steel reactor of 10 liter capacity, fitted with an anchor agitator, thermometer and reflux condensor with a device which makes it possible to work under controlled pressure whilst maintaining an inert atmosphere, are introduced 7,500 grams of a suspension containing 20% by weight of etherified polyoxymethylene homopolymer dispersed in a liquid medium consisting of 66% by weight of water, 33% by weight of methanol and 1% by weight of triethanolamine.

The polyoxymethylene homopolymer was obtained by polymerization of anhydrous monomeric formaldehyde with an anionic initiator, and the said homopolymer was then etherified with triethyl orthoformate in the presence of sulphuric acid.

The etherified homopolymer has an inherent viscosity of 1.34 (as measured at 60° C in a solution in p-chlorophenol with 2% of α-pinene containing 0.5 g of polymer per dl), and has moreover the following thermal stability ($K_{220}$) and alkaline attack stability (ASF).

$K_{220}$ — Percentage loss of weight per minute at 220° C in a nitrogen atmosphere, measured on a thermobalance, for a time of 60 minutes: 0.10% by weight per minute up to a loss of 4.4% of etherified homopolymer, and subsequently 0.03% by weight per minute.

ASF — The etherified homopolymer is kept in solution in benzyl alcohol containing 1% of triethanolamine at 150°–152° C for 30 minutes. The etherified homopolymer/benzyl alcohol ratio is equal to 1:10. Finally the etherified homopolymer is precipitated by cooling the solution, filtered, washed with methanol, and dried. The percentage of etherified homopolymer remaining or alkali-stable fraction (ASF), is 96.1%.

The suspension in the reactor is brought to a temperature of 138° C for 2 hours. Finally it is cooled, filtered, washed thoroughly with acetone and vacuum dried in an oven at 80° C.

Thus 1443 grams of etherised homopolymer are recovered with a yield of 96.2% with respect to the feed.

The etherised homopolymer (POM-1) thus treated has the following properties:

$\eta e = 1.35$
$K_{220} = 0.02\%/min.$ (constant value)
ASF = 99.8%

EXAMPLE 2

Into the reactor of Example 1 are introduced 7,500 grams of a suspension containing 22.5% by weight of etherified polyoxymethylene (POM-2) dispersed in a liquid medium consisting of water (55% by weight), butane-1,4-diol (44.85% by weight) and lithium hydroxide (0.15% by weight).

The homopolymer etherified with trimethyl orthoformate in the presence of para-toluenesulphonic acid, has the properties recorded in Table 1.

The suspension is brought to a temperature of 145° C for 4 hours. Finally it is cooled, filtered, washed with methanol and then with water, and vacuum dried in an oven at 90° C.

1470 grams of etherified homopolymer are recovered with a yield of 87.1% with respect to that subjected to treatment.

The etherified homopolymer thus treated (POM-3) has the properties recorded in Table 1.

Table 1

| | POM-2 | POM-3 |
|---|---|---|
| $\eta e$ | 1.15 | 1.16 |
| $K_{220}$ (%/min) | 0.22 up to a loss of 12.4% 0.03 subsequently | 0.01 (constant) |
| ASF (%) | 87.0 | ≧99.8 |

EXAMPLE 3

The reactor of Example 1 is charged with 7,500 grams of a suspension containing 10% by weight of etherified polyoxymethylene homopolymer (POM-4) dispersed in a liquid medium consisting of water (80% by weight), ethanol (13.5% by weight) and ammonia (6.5% by weight).

The homopolymer was etherified with triethyl orthoformate in the presence of ethyl sulphate, and has the characteristics recorded in Table 2.

The suspension is heated to 150° C for 90 minutes. Finally it is cooled, filtered, washed with water and vacuum dried in an oven at 90° C.

672 grams of etherified homopolymer are recovered with a yield of 89.6% with respect to the feed.

The properties of the etherified homopolymer thus treated (POM-5) are indicated in Table 2.

Table 2

|  | POM-4 | POM-5 |
|---|---|---|
| $\eta e$ | 1.77 | 1.79 |
| $K_{220}$ %(min.) | 0.18 up to a loss of 10.1% 0.05 subsequently | 0.015 (constant) |
| ASF (%) | 89.4 | $\geq 99.8$ |

EXAMPLE 4

The reactor of Example 1 is charged with 7,500 grams of a suspension containing 33.3% by weight of etherified polyoxymethylene homopolymer, dispersed in a liquid medium consisting of water (20% by weight), ethylene glycol (74% by weight) and triethanolamine (6% by weight).

The polyoxymethylene homopolymer was made by polymerization of trioxan with a cationic initiator, and it was then etherified with triethyl orthoacetate in the presence of phosphoric acid.

The etherified homopolymer has the properties recorded in Table 3 under POM-6.

The suspension is heated to 148° C for 3 hours. Finally it is cooled, filtered, washed with methanol and vacuum dried in an oven at 80° C.

2172 grams of etherified homopolymer are recovered with a yield of 87.0% with respect to the feed.

The properties of the etherified homopolymer thus treated are recorded in Table 3 under POM-7.

Table 3

|  | POM-6 | POM-7 |
|---|---|---|
| $\eta e$ | 1.54 | 1.54 |
| $K_{220}$ (%/min.) | 0.25 up to a loss of 21.1% 0.08 subsequently | 0.01 (constant) |
| ASF (%) | 86.9 | $\geq 99.8$ |

EXAMPLE 5

The reactor of Example 1 is charged with 7500 grams of a suspension containing 25% by weight of etherified polyoxymethylene homopolymer, dispersed in a liquid medium consisting of water (60% by weight), trioxan (20% by weight) and ammonia (20% by weight).

The polyoxymethylene homopolymer was made by polymerization of anhydrous monomeric formaldehyde with an anionic initiator and was then etherified with triethyl or orthobenzoate in the presence of para-toluenesulphonic acid.

The said etherified homopolymer has the properties recorded in Table 4 under POM-8.

The suspension is heated to 135° C for 20 minutes. Finally it is cooled, filtered, washed with water and vacuum dried in an oven at 90° C.

1579 grams of etherified homopolymer are recovered with a yield of 84.2% with respect to the feed.

The properties of the etherified homopolymer thus treated are recorded in Table 4 under POM-9.

Table 4

|  | POM-8 | POM-9 |
|---|---|---|
| $\eta e$ | 1.91 | 1.89 |
| $K_{220}$(%/min) | 0.38 up to a loss of 15.5% 0.03 subsequently | 0.01 (constant) |
| ASF (%) | 84.0 | $\geq 99.8$ |

EXAMPLE 6

The etherified polyoxymethylene of Example 5 (POM-8) is fed in the form of a 15% by weight suspension in a 20% by weight aqueous solution of ammonia, into a tubular horizontal reactor, with a useful capacity of 20 liters.

The reactor is fitted with a vigorous agitator which is able to guarantee an excellent thermal exchange.

The suspension is continuously introduced at a rate of 60 Kg/hour. The temperature in the reactor is maintained at 140° C.

The suspension discharged from the reactor is centrifuged, and after cooling the etherified homopolymer is separated, thoroughly washed with water and dried.

7.59 Kg/hour of etherified homopolymer are obtained with a yield of 84.3% with respect to the feed.

The properties of the etherified homopolymer thus treated are the following:

$\eta e$ — 1.89

$K_{220}$ — 0.01 (%/min.)

992 parts by weight of the etherified homopolymer thus treated are admixed with 3.5 parts by weight of pentaerythritol tetra-$\beta$-(4-hydroxy-3,5-di-t-butylphenyl) propionate and 3.5 parts by weight of nylon 12.

After thorough homogenization the mixture is extruded and converted into granules in a one-screw extruder at a temperature of from 190° to 210° C.

The thermal degradation in air of the granular product is determined.

$D_{220}$ — Thermal degradation in air at 220° C: loss in percentage by weight after 10, 20 and 30 minutes at the said temperature, measured by means of a thermobalance. The volatile degradation products are continuously removed by flushing with a stream of air.

The following $D_{220}$ values were recorded on the granules:

10 minutes = 0.15%
20 minutes = 0.30%
30 minutes = 0.45%.

What we claim is:

1. A method for eliminating the unstable polyoxymethylene chains of an etherified acetal homopolymer, which comprises forming a suspension of said etherified acetal homopolymer, a basic compound and a polar liquid diluent, said polar liquid diluent consisting of water or a mixture of at least 20% water and a polar organic compound, said suspension containing 10 to 40 weight % of said homopolymer and 0.05 to 20 weight % based on the weight of the liquid diluent of said basic compound and said suspension having a pH of from 9 to 11;

and heat-treating said suspension at a temperature of from 100° to 160° C and below the melting point of said polymer and at a pressure such as to maintain said diluent in liquid form, for a period of time such as to ensure substantially complete degradation of said unstable chains.

2. The method of claim 1, wherein said polar organic compound is soluble in water under the heat-treatment conditions, has at least one atom of oxygen directly linked to an atom of carbon and has no acidic properties.

3. The method of claim 1, wherein said polar organic compound is selected from the group consisting of mono- and polyhydric alcohols, ketones and linear or cyclic ethers.

4. The method of claim 1, wherein said liquid diluent contains from 60 to 98 wt.% of water.

5. The method of claim 1, wherein said basic compound is chosen from hydroxides of alkali or alkaline earth metals, amines, ammonia, amino-alcohols and salts of a strong base and a weak acid.

6. The method of claim 1, wherein said suspension is heat-treated at a temperature of from 120° to 155° C.

7. The method of claim 1, wherein said suspension is heat-treated for a period of from 1 minute to 5 hours.

8. The method of claim 1, wherein said suspension is heat-treated for a period of from 5 minutes to 3 hours.

9. The method of claim 3 wherein said polar organic compound is a mono or polyhydric alcohol.

10. The method of claim 9 wherein said basic compound is selected from the group consisting of triethanolamine, alkali or alkaline earth metal hydroxides and ammonia.

11. The method of claim 9 wherein said basic compound is ammonia.

12. The method of claim 10 wherein said basic compound is an alkali or alkaline earth metal hydroxide.

13. The method of claim 10 wherein said basic compound is ammonia.

14. The method of claim 1 wherein said polar liquid diluent is a mixture of water and a polar organic compound and contains at least 20% water.

15. The method of claim 10 wherein said polar liquid diluent is a mixture of water and a polar organic compound and contains at least 20% water.

* * * * *